US011586924B2

(12) United States Patent
Sarah et al.

(10) Patent No.: US 11,586,924 B2
(45) Date of Patent: Feb. 21, 2023

(54) DETERMINING LAYER RANKS FOR COMPRESSION OF DEEP NETWORKS

(71) Applicant: QUALCOMM Incorporated, San Diego, CA (US)

(72) Inventors: Anthony Sarah, San Diego, CA (US); Raghuraman Krishnamoorthi, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 1266 days.

(21) Appl. No.: 15/877,723

(22) Filed: Jan. 23, 2018

(65) Prior Publication Data

US 2019/0228311 A1 Jul. 25, 2019

(51) Int. Cl.
*G06N 3/08* (2006.01)
*G06N 3/084* (2023.01)
*G06N 3/04* (2023.01)

(52) U.S. Cl.
CPC ............... *G06N 3/084* (2013.01); *G06N 3/04* (2013.01)

(58) Field of Classification Search
CPC .... G06N 3/084; G06N 3/0481; G06N 3/0445; G06N 3/0472; G06N 3/063; G06N 3/04; G06N 3/0454
See application file for complete search history.

(56) References Cited

U.S. PATENT DOCUMENTS

| 9,400,955 | B2 | 7/2016 | Garimella | |
| 9,728,184 | B2 * | 8/2017 | Xue | G06N 3/084 |
| 9,767,410 | B1 | 9/2017 | Guevara et al. | |
| 10,621,486 | B2 * | 4/2020 | Yao | G06F 7/5443 |
| 11,023,593 | B2 * | 6/2021 | Lee | G06Q 10/06 |
| 11,048,997 | B2 * | 6/2021 | Mathew | G06N 3/0454 |
| 11,227,213 | B2 * | 1/2022 | Wang | G06N 3/04 |
| 2016/0162782 | A1 * | 6/2016 | Park | G06N 3/082 706/17 |
| 2016/0217369 | A1 * | 7/2016 | Annapureddy | G06N 3/082 |
| 2016/0328644 | A1 * | 11/2016 | Lin | G06N 3/084 |

(Continued)

FOREIGN PATENT DOCUMENTS

JP 6666457 B2 * 3/2020 .......... G06N 3/0445
RU 2734579 C1 * 10/2020

(Continued)

OTHER PUBLICATIONS

Nakkiran P., et al., "Compressing Deep Neural Networks using a Rank-Constrained Topology", Proceedings of Annual Conference of the International Speech Communication Association, 2015, pp. 1473-1477.

*Primary Examiner* — Alan Chen
(74) *Attorney, Agent, or Firm* — Arent Fox LLP

(57) ABSTRACT

An apparatus of operating a computational network is configured to determine a low-rank approximation for one or more layers of the computational network based at least in part on a set of residual targets. A set of candidate rank vectors corresponding to the set of residual targets may be determined. Each of the candidate rank vectors may be evaluated using an objective function. A candidate rank vector may be selected and used to determine the low rank approximation. The computational network may be compressed based on the low-rank approximation. In turn the computational network may be operated using the one or more compressed layers.

30 Claims, 5 Drawing Sheets

(56) References Cited

U.S. PATENT DOCUMENTS

| | | | |
|---|---|---|---|
| 2016/0358070 A1* | 12/2016 | Brothers | G06N 3/0454 |
| 2017/0220925 A1* | 8/2017 | Alsharif | G06N 3/08 |
| 2018/0293758 A1* | 10/2018 | Bar-On | G06N 3/0454 |
| 2019/0050372 A1* | 2/2019 | Zeng | G06K 9/6247 |
| 2019/0086501 A1* | 3/2019 | Bydder | G01R 33/5611 |

FOREIGN PATENT DOCUMENTS

| | | | | |
|---|---|---|---|---|
| WO | 2016182674 A1 | 11/2016 | | |
| WO | WO-2017151203 A1 * | 9/2017 | | G06N 3/0445 |

* cited by examiner

DETERMINING LAYER RANKS FOR COMPRESSION OF DEEP NETWORKS

BACKGROUND

Field

Certain aspects of the present disclosure generally relate to machine learning and, more particularly, to improving systems and methods of determining layer ranks for compression of deep networks.

Background

An artificial neural network, which may include an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so deep neural networks have increasingly been used in object recognition applications. Like convolutional neural networks, computation in deep learning architectures may be distributed over a population of processing nodes, which may be configured in one or more computational chains. Such multi-layered architectures may be trained one layer at a time and may be fine-tuned using back propagation.

Although these solutions achieve excellent results on a number of classification benchmarks, the computational complexity of such solutions can be prohibitively high. Additionally, training of the models may be challenging.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The purpose of the summary is to present some concepts of one or more aspects in a simplified form as a prelude to the more detailed description that is presented later.

It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The features, which are believed to be characteristic of the disclosure, both as to its organization and method of operation, together with further advantages, will be better understood from the following description when considered in connection with the accompanying figures. It is to be expressly understood, however, that each of the figures is provided for the purpose of illustration and description only and is not intended as a definition of the limits of the present disclosure.

Processing data with deep networks may utilize a relatively large amount of computation. The large amount of computation may preclude the use of more sophisticated (e.g., larger) computational networks on resource-constrained platforms such as embedded systems (e.g., mobile computing devices and IoT (Internet of Things) devices).

To address the issue of computational complexity while maintaining an acceptable performance, a computational network (e.g., neural network) may be compressed without fine tuning (e.g., training the network) by computing a low-rank approximation based on a rank determined according to an objective function based on defined residual targets.

In an aspect of the disclosure, a method, a computer readable medium, and apparatus for operating a computational network are provided. The apparatus includes a memory and at least one processor coupled to the memory. The processor(s) are configured to determine a low-rank approximation for one or more layers of the computational network based at least in part on a set of residual targets. The processor(s) are also configured to compress at least one layer of the computational network based at least in part on the low-rank approximation. The processor(s) are further configured to operate the computational network using the at least one compressed layer.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The features, which are believed to be characteristic of the disclosure, both as to its organization and method of operation, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
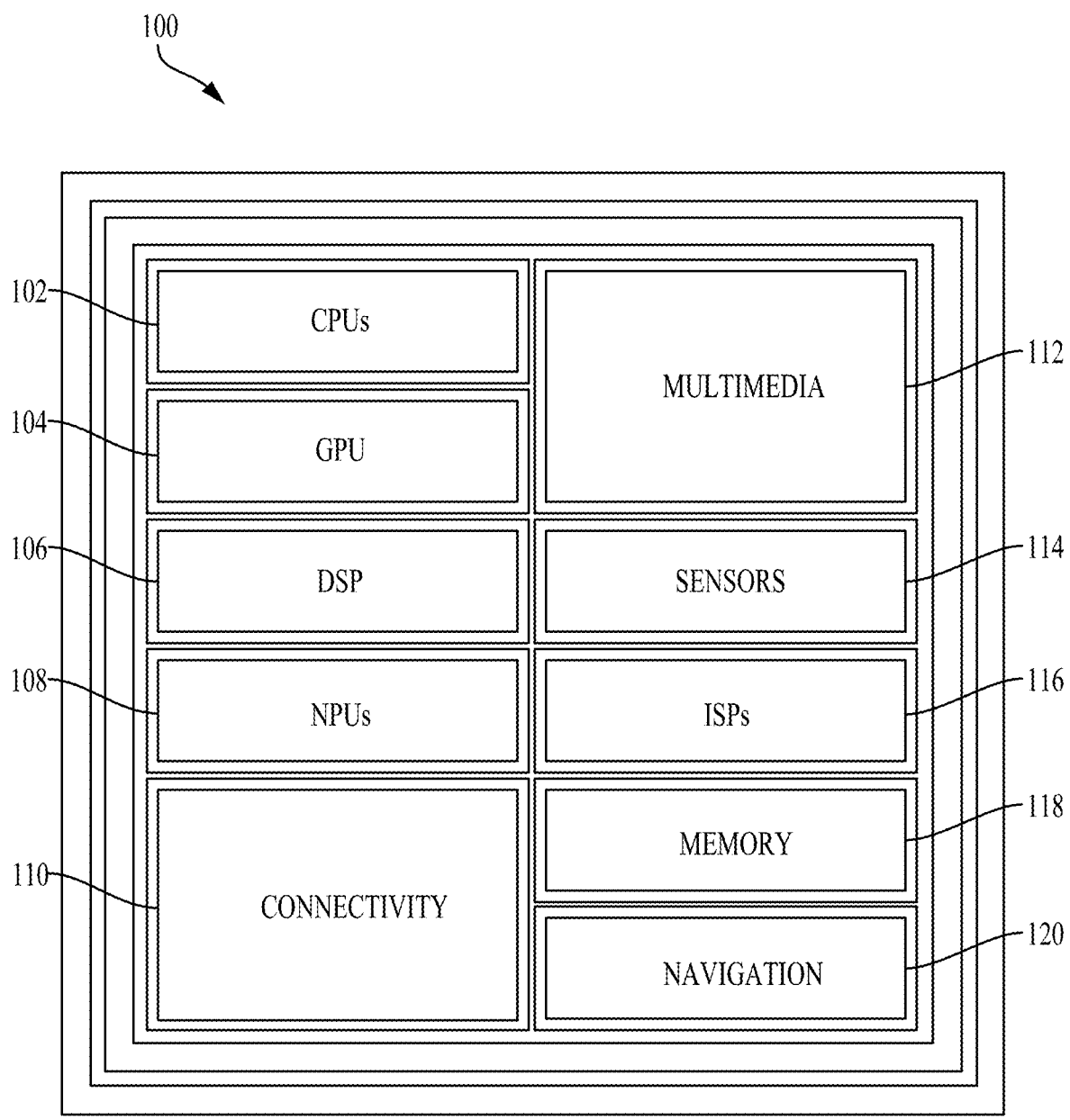
FIG. 1 illustrates an example implementation of designing a computational network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without such specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, with the scope of the disclosure being defined by the appended claims and equivalents thereof.

Determining Layer Ranks for Compression of Deep Networks

Processing data with deep networks may utilize a relatively large amount of computation. The large amount of computation may preclude the use of more sophisticated (e.g., larger) networks on resource-constrained platforms such as embedded systems (e.g., mobile computing devices and IoT (Internet of Things) devices). In turn, advances in deep networks may not be used on devices such as mobile phones. Accordingly, aspects of the present disclosure are directed to reducing the computational requirements through compression of deep networks.

In accordance with aspects of the present disclosure, weight tensors in layers of the computational network (e.g., neural network) may be removed using singular value decomposition (SVD). SVD is a factorization of any real or complex matrix $W \in \mathbb{R}^{m \times n}$. Applying SVD, $W \in \mathbb{R}^{m \times n}$ may be truncated as $W \approx \hat{W} = \hat{U}\hat{S}\hat{V}^T$, where $\hat{U} \in \mathbb{R}^{m \times n}$ is a unitary matrix, $\hat{S} \in \mathbb{R}^{m \times n}$ is a diagonal matrix and $\hat{V} \in \mathbb{R}^{m \times n}$ is a unitary matrix. The diagonal entries of $\hat{S} \in \mathbb{R}^{m \times n}$ may be referred to as the singular values of the diagonal matrix. The singular values may be ordered along the diagonal in descending order. The truncated matrix $\hat{W}$ represents a low-rank approximation of the original matrix W. By using SVD, the model size and computational complexity may be decreased. However, the decrease may be at the cost of model accuracy. Thus, determining the rank for each layer is challenging.

Accordingly, aspects of the present disclosure are directed to rank selection for compression of the deep networks. By providing efficient selection of layer ranks, more effective compression of deep networks may be achieved (e.g., increased accuracy with increasingly more compression). In turn, more sophisticated learning algorithms may be run on more platforms (e.g., where resources are limited or where latency should be minimized).

FIG. 1 illustrates an example implementation of a method for performing automatic rank selection to operate a computational network using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a Neural Processing Unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may include code for determining a low-rank approximation for one or more layers of the computational network based at least in part on a set of residual targets. The instructions loaded into the general-purpose processor 102 may also include code for compressing at least one layer of the computational network based at least in part on the low-rank approximation. The instructions loaded into the general-purpose processor 102 may further include code for operating the computational network using the at least one compressed layer.

Figure 2:
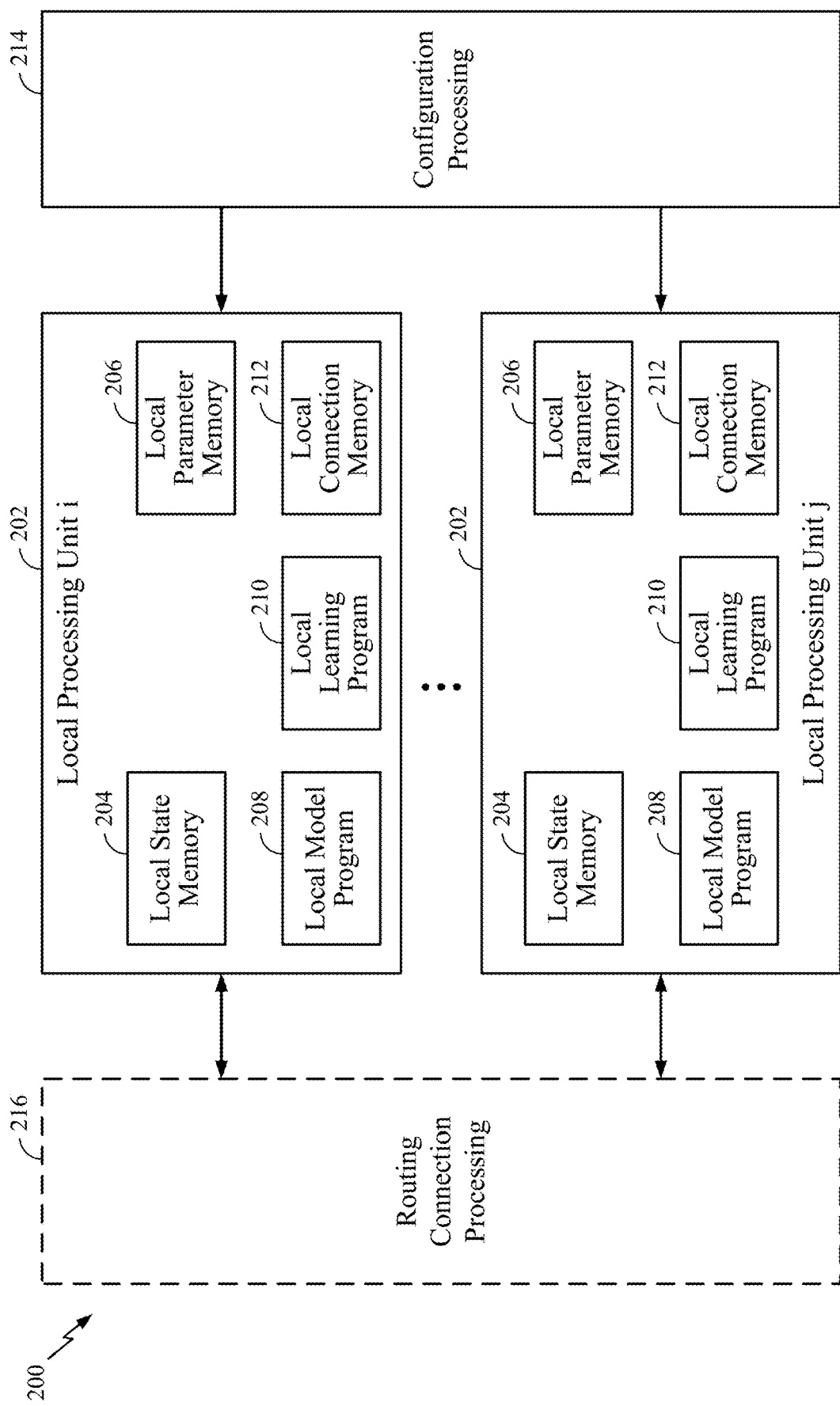
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may include a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human engineer might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or to represent words in auditory data. Still higher layers may learn to recognize common visual objects or to recognize spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
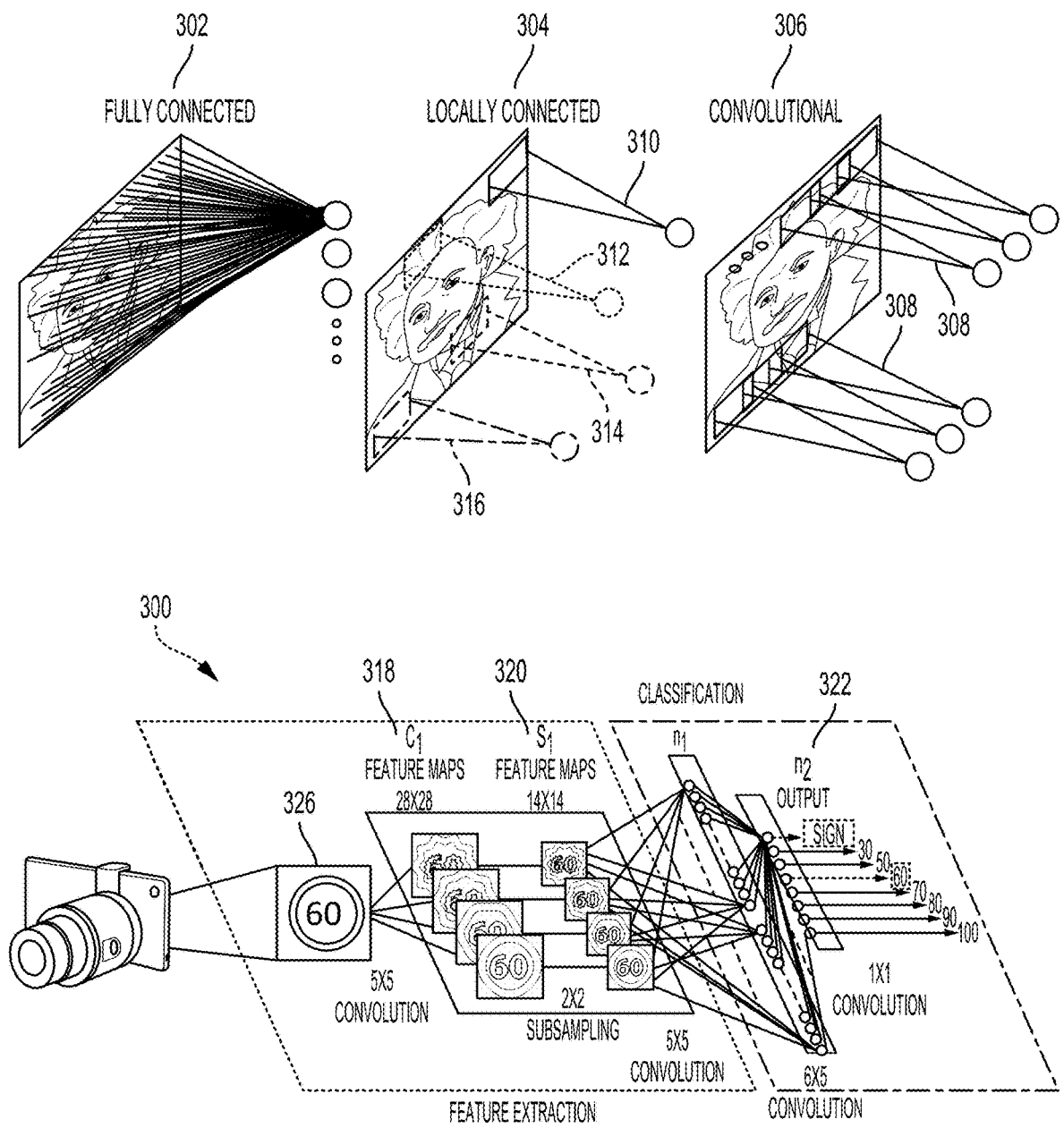
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate the neuron's output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connection strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on the higher layer neurons association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as the adjusting of the weights involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that may learn a probability distribution over a set of inputs. Because RBMs may learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs may be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer may be shared across the neurons in the first layer. The feed-forward and shared connections of DCNs may be exploited for fast processing. The computational burden of a DCN may be much less, for example, than that of a similarly sized neural network that includes recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
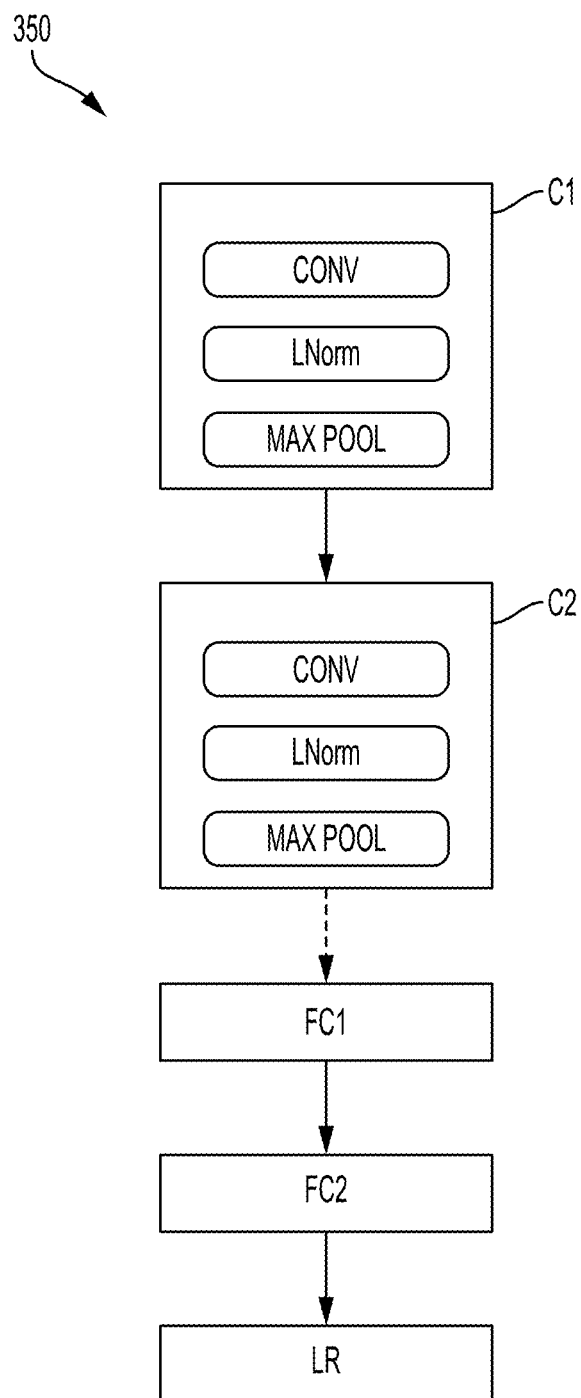
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

In accordance with aspects of the present disclosure, one or more layers of a deep network such as deep convolutional network 350 may be compressed. That is, the computations performed for the layer(s) may be reduced. In one example, a fully connected layer of DCN 350 (e.g., FC1) may be compressed by applying SVD. Given a weight matrix of a fully connected layer $W \in \mathbb{R}^{m \times n}$, the weight matrix may be decomposed into two matrices $W \approx W_a W_b$, where $W_a \in \mathbb{R}^{m \times r}$, $W_b \in \mathbb{R}^{r \times n}$ and r is the rank of the matrices, where m and r are integers. Decomposition may be performed using SVD such that $W = USV^T$, where $W_a = \hat{U}$, $W_b = \hat{S}\hat{V}^T$, $\hat{U} \in \mathbb{R}^{m \times r}$, $\hat{S} \in \mathbb{R}^{r \times r}$, and $\hat{V} \in \mathbb{R}^{n \times r}$.

In another example, a convolution layer of DCN 350 (e.g., CONV of C1) may be compressed. Given a weight tensor $W \in \mathbb{R}^{m \times n \times k \times k}$ of the convolution layer, the weight tensor may be decomposed into two weight tensors $W \approx W_a \otimes W_b$, where $W_a \in \mathbb{R}^{m \times r \times 1 \times 1}$, $W_b \in \mathbb{R}^{r \times n \times k \times k}$ and r is the rank of the tensors, where m, n, and k are integers. Since W is a 4D tensor in this example, W may be folded or transformed to a matrix before applying SVD such that $W' \in \mathbb{R}^{m \times nk^2}$ is a 2D tensor (matrix) folded on output and kernel modes. The decomposition may then be performed using SVD such that $W' = USV^T$ where $W'_a = \hat{U}$, $W'_b = \hat{S}\hat{V}^T$, $\hat{U} \in \mathbb{R}^{m \times r}$, $\hat{S} \in \mathbb{R}^{r \times r}$, and $\hat{V} \in \mathbb{R}^{nk^2 \times r}$. The decomposed matrices may be unfolded into 4D tensors $W_a \in \mathbb{R}^{m \times r \times 1 \times 1}$, $W_b \in \mathbb{R}^{r \times n \times k \times k}$.

To maintain a certain level of accuracy, an objective function, which is a function designed to determine an optimal value of a given parameter, may be used to determine the rank of one or more layers of the network. The objective function may be expressed as:

$$\Psi(r) = \begin{cases} (1 - a(r)) + (1 - f(r)), & a(r) \geq a_m \\ 1 + (1 - f_m), & \text{otherwise} \end{cases} \quad (1)$$

where r is a vector of ranks for each layer, $a(r) \in [0,1]$ is the accuracy of the network in determining an inference for the specified rank of the vector of ranks, $f(r) \in [0,1]$ is a complexity metric (e.g., fraction of removed multiply accumulate operations (MACs)), $a_m$ is a minimum allowed accuracy, $f_m \leq 0$ is the minimum amount of a complexity metric (e.g. minimum removed fractions). In some aspects, the complexity metric f(r) may also represent other complexity measures including, but not limited to number of removed weights, latency in the network, or processing time. Using the objective function, an optimal rank for one or more layers may be determined. In some aspects, the complexity may be constant in the number of layers. Additional optimization methods (e.g., pattern search algorithm) may also be used with the objective function for determining the optimal ranks.

The ranks for one or more layers of the network may be determined using a tensor approximation residual given by:

$$r_F = \frac{\|w - \hat{w}\|_F}{\|w\|_F}, \quad (2)$$

where W is the folded, original weight tensor, $\hat{W}$ is the folded, low-rank approximation (compressed with a specific r) and $\|\cdot\|_F$ denotes the Frobenius norm. The Frobenius norm is a matrix norm of an m×n matrix and is defined as the square root of the sum of the absolute squares of the elements of the matrix. The value of $r_F$ may be in the range between 0 and 1. The value of $r_F$ may provide an indication of the quality of the low-rank approximation. For example, the closer the value of $r_F$ is to 0, the better the approximation—which may mean that the compressed network has little or no change in accuracy of the output. On the other hand, if the value of $r_F$ is close to 1, the approximation may not produce accurate inferences.

A set of residual targets $T_F = \{0.02, 0.04, 0.06, \ldots\}$ may be defined. In some aspects, the residual targets may be user-defined. Given a residual target $t_F \in T_F$, a corresponding rank for each layer may be determined. That is, for each of the residual targets, the rank that produces a residual $r_F$ corresponding to the residual target may be determined. The process of determining the corresponding rank of the residual targets may be repeated for each residual target $t_F$ to generate a set of rank vectors $\{r_1, \ldots, r_{|T_F|}\}$. The set of rank vectors may be specified and include a rank vector for each residual target. Each rank vector includes a rank for each layer in the network. The rank vectors may comprise candidates for the rank of each of the network layers.

The network may be operated using each of the candidate rank vectors. The accuracy may be determined for each candidate vector. Accordingly, each of the candidate rank vectors may be evaluated using equation 1 to determine the ranks of the layers of the network. The values of $\psi(r)$ may be computed for each of the candidate rank vectors. The computed values may then be compared. The rank vector that produces the lowest value of $\psi(r)$ may be selected and used for operating the network. Accordingly, the rank for each layer of the network may be automatically determined.

Since the rank selection and compression described above is based on residual targets and is independent of the number of layers in the computational network, compression may be achieved for arbitrarily deep networks. Furthermore, the aspects of the present disclosure may perform compression without fine-tuning. Thus, the rank selection and compression may be performed in the absence of a training data set.

In some aspects, a bias of a layer may be updated to compensate for a mean shift in the distribution of outputs (e.g., output activations) for each layer. During compression of the network, weight tensors are replaced by low-rank approximation. The weights are replaced by a low-rank approximation (e.g., based on a tradeoff between rank and a network metric (e.g., accuracy, complexity, completion time). The low-rank approximation may be a rank suitable for providing a defined accuracy level (e.g., user-defined accuracy level), for example. As a result, the output activations at each layer are changed and in turn shift the mean of the activation distribution. The mean shift may be compensated for by updating the bias of a layer (e.g., second layer) as follows:

$$b_b = (W - \hat{W})^T m + b, \quad (3)$$

where $W \in \mathbb{R}^{m \times n}$ is the original weight matrix, $\hat{W} \in \mathbb{R}^{m \times n}$ is the low-rank approximation of the weight matrix, $b \in \mathbb{R}^n$ is the original bias vector and $m \in \mathbb{R}^m$ is the vector of the input. Accordingly, by compensating for the mean shift, a smaller rank may be used thus the network may be further compressed while providing the same or comparable accuracy as the uncompressed network.

Figure 4:
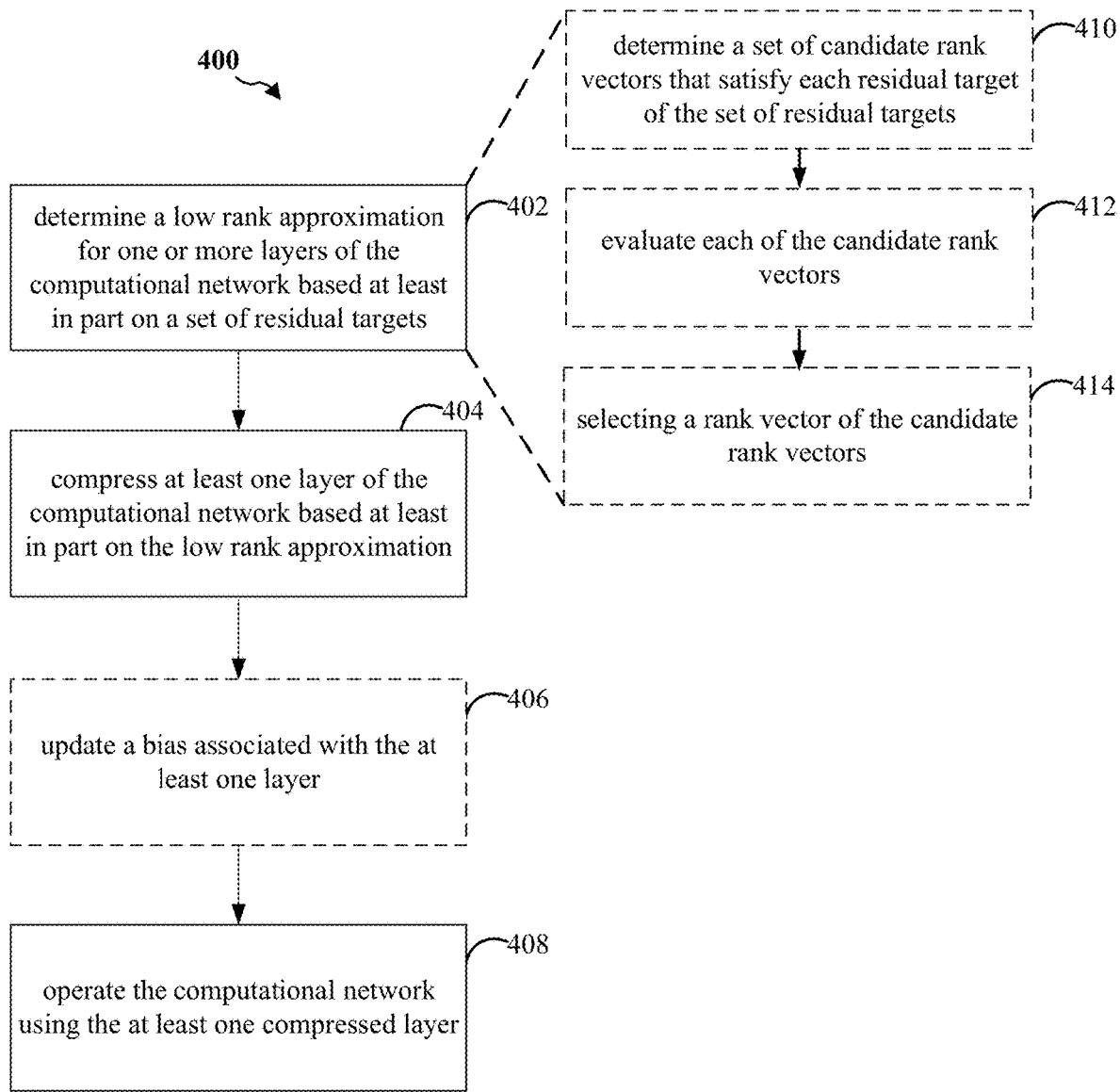
FIG. 4 illustrates a method for operating a computational network according to aspects of the present disclosure.

FIG. 4 illustrates a method 400 for operating a computational network. In block 402, the process determines a low-rank approximation for one or more layers of the computational network based at least in part on a set of residual targets. The residual targets may be user-defined, for example. The low-rank approximation may optionally be determined as shown in blocks 410-412. In block 410, the process may optionally determine a set of candidate rank vectors that satisfy each of the residual targets of the set of residual targets. In block 412, the candidate rank vectors may optionally be evaluated to determine the effect of each on network performance (e.g., value of the objective function $\psi(r)$), for example. In block 414, the process may optionally select a rank vector of the candidate rank vectors according to an objective function. For example, the candidate rank vector producing the smallest effect on network performance may be used to determine the low-rank approximation.

The low-rank approximation may be determined using singular value decomposition. Additionally, the low-rank approximation may be determined without fine tuning. In some aspects, the low-rank approximation may be automatically determined based on a performance metric. The performance metric may include accuracy (e.g., completion time), complexity (e.g., number of layers, fraction of removed MACs, number of removed weights, latency in the network), or a combination thereof, for example.

In block 404, the process compresses at least one layer of the computational network based at least in part on the low-rank approximation. For example, as described above, a fully connected layer of DCN 350 (e.g., FC1) may be compressed by applying SVD. Given a weight matrix of a fully connected layer $W \in \mathbb{R}^{m \times n}$, the weight matrix may be decomposed into two matrices $W \approx W_a W_b$, where $W_a \in \mathbb{R}^{m \times r}$, $W_b \in \mathbb{R}^{r \times n}$ and r is the rank of the matrices, where m and r are integers. Decomposition may be performed using SVD such that $W = USV^T$, where $W_a = \hat{U}$, $W_b = \hat{S}\hat{V}^T$, $\hat{U} \in \mathbb{R}^{m \times r}$, $\hat{S} \in \mathbb{R}^{r \times r}$, and $\hat{V} \in \mathbb{R}^{n \times r}$.

In block 406, the process may optionally update a bias associated with the at least one layer. In some aspects, the bias may be updated by applying a vector m to compensate for a mean shift in an output activation of the at least one compressed layer and an output activation of the at least one layer. Updating the bias may compensate for a mean shift in the output activations distribution as a result of the compression.

In block 408, the process may operate the computational network using the at least one compressed layer. For example, using a compressed layers, the computational network (e.g., DCN 350) may be operated to compute an inference. That is, the network may receive an input (e.g., corresponding to an image). The input may be supplied to inputs may be applied to weights of the compressed layer to produce an activations for subsequent layers of the compressed network to ultimately produce an output inference (e.g., probability of an image classification).

In one configuration, a machine learning model is configured for determining a low-rank approximation for one or more layers of the computational network based at least in part on a set of residual targets. The model is also configured for compressing at least one layer of the computational network based at least in part on the low-rank approximation. The model is further configured for operating the computational network using the at least one compressed layer. The model includes a determining means, compressing means, and/or operating means. In one aspect, the determining means, compressing means, and/or operating means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

In some aspects, method 400 may be performed by the SOC 100 (FIG. 1) or the system 200 (FIG. 2). That is, each of the elements of method 400 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software component may include a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus.

The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules or components. The software components include instructions that, when executed by the processor, cause the processing system to perform various functions. The software components may include a transmission component and a receiving component. Each software component may reside in a single storage device or be distributed across multiple storage devices. By way of example, a software component may be loaded into RAM from a hard drive when a triggering event occurs. During execution of the software component, the processor may load some of the instructions into cache to increase access speed. One or more cache lines may then be loaded into a general register file for execution by the processor. When referring to the functionality of a software component below, it will be understood that such functionality is implemented by the processor when executing instructions from that software component. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules, components, and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of operating a computational network, comprising:
   determining a low-rank approximation for one or more layers of the computational network based at least in part on a set of targets respectively corresponding to a set of tensor approximation residuals, and a rank vector of a set of candidate rank vectors associated with the set of tensor approximation residuals;
   compressing at least one layer of the computational network based at least in part on the low-rank approximation; and
   operating the computational network using the at least one compressed layer.

2. The method of claim 1 wherein, the low-rank approximation is automatically determined based on a performance metric.

3. The method of claim 2, wherein the performance metric includes at least one of an accuracy metric, a completion time metric, and a complexity metric.

4. The method of claim 1, wherein the compressing the at least one layer includes updating a bias associated with the at least one layer.

5. The method of claim 4, wherein, the bias is updated by applying a vector m to compensate for a mean shift in an output activation of the at least one compressed layer and an output activation of the at least one layer.

6. The method of claim 1, wherein the low-rank approximation is determined without fine tuning.

7. The method of claim 1, wherein the low-rank approximation is determined using singular value decomposition.

8. The method of claim 1, wherein the determining comprises:
   determining the set of candidate rank vectors, wherein the set of candidate rank vectors satisfy each target of the set of targets;
   evaluating each candidate rank vector of the set of candidate rank vectors; and
   selecting the rank vector of the set of candidate rank vectors based on evaluations of a minimization function using the set of candidate rank vectors.

9. An apparatus of operating a computational network, comprising:
   a memory; and
   at least one processor coupled to the memory, the at least one processor being configured to:
      determine a low-rank approximation for one or more layers of the computational network based at least in part on a set of targets respectively corresponding to a set of tensor approximation residuals, and a rank vector of a set of candidate rank vectors associated with the set of tensor approximation residuals;
      compress at least one layer of the computational network based at least in part on the low-rank approximation; and
      operate the computational network using the at least one compressed layer.

10. The apparatus of claim 9 wherein, the at least one processor is further configured to determine the low-rank approximation automatically based on a performance metric.

11. The apparatus of claim 10, wherein the performance metric includes at least one of an accuracy metric, a completion time metric, and a complexity metric.

12. The apparatus of claim 9, wherein the at least one processor is further configured to update a bias associated with the at least one layer.

13. The apparatus of claim 12, wherein, the at least one processor is further configured to update the bias by applying a vector m to compensate for a mean shift in an output activation of the at least one compressed layer and an output activation of the at least one layer.

14. The apparatus of claim 9, wherein the at least one processor is further configured to determine the low-rank approximation without fine tuning.

15. The apparatus of claim 9, wherein the at least one processor is further configured to determine the low-rank approximation using singular value decomposition.

16. The apparatus of claim 9, wherein the at least one processor is further configured to:
   determine the set of candidate rank vectors, wherein the set of candidate rank vectors satisfy each target of the set of targets;
   evaluate each candidate rank vector of the set of candidate rank vectors; and
   select the rank vector of the set of candidate rank vectors based on evaluations of a minimization function using the set of candidate rank vectors.

17. An apparatus for operating a computational network, comprising:
   means for determining a low-rank approximation for one or more layers of the computational network based at least in part on a set of targets respectively corresponding to a set of tensor approximation residuals, and a rank vector of a set of candidate rank vectors associated with the set of tensor approximation residuals;
   means for compressing at least one layer of the computational network based at least in part on the low-rank approximation; and
   means for operating the computational network using the at least one compressed layer.

18. The apparatus of claim 17, wherein the low-rank approximation is automatically determined based on a performance metric.

19. The apparatus of claim 18, wherein the performance metric includes at least one of an accuracy metric, a completion time metric, and a complexity metric.

20. The apparatus of claim 17, further comprising means for updating a bias associated with the at least one layer.

21. The apparatus of claim 17, further comprising means for applying a vector m to compensate for a mean shift in an output activation of the at least one compressed layer and an output activation of the at least one layer.

22. The apparatus of claim 17, further comprising means for determining the low-rank approximation without fine tuning.

23. The apparatus of claim 17, further comprising means for determining the low-rank approximation using singular value decomposition.

24. The apparatus of claim 17, further comprising:
   means for determining set of candidate rank vectors, wherein the set of candidate rank vectors satisfy each target of the set of targets;
   means for evaluating each candidate rank vector of the set of candidate rank vectors; and
   means for selecting the rank vector of the set of candidate rank vectors based on evaluations of a minimization function using the set of candidate rank vectors.

25. A non-transitory, computer readable medium having executable code for operating a computational network, comprising code to:
   determine a low-rank approximation for one or more layers of the computational network based at least in part on a set of targets respectively corresponding to a set of tensor approximation residuals, and a rank vector of a set of candidate rank vectors associated with the set of tensor approximation residuals;
   compress at least one layer of the computational network based at least in part on the low-rank approximation; and
   operate the computational network using the at least one compressed layer.

26. The non-transitory, computer readable medium of claim 25, further comprising code to determine the low-rank approximation automatically based on a performance metric, the performance metric comprising at least one of an accuracy metric, a completion time metric, and a complexity metric.

27. The non-transitory, computer readable medium of claim 25, further comprising code to update a bias by applying a vector m to compensate for a mean shift in an output activation of the at least one compressed layer and an output activation of the at least one layer.

28. The non-transitory, computer readable medium of claim 25, further comprising code to determine the low-rank approximation without fine tuning.

29. The non-transitory, computer readable medium of claim 25, further comprising code to determine the low-rank approximation using singular value decomposition.

30. The non-transitory, computer readable medium of claim 25, further comprising code to:
   determine the set of candidate rank vectors, wherein the set of candidate rank vectors satisfy each target of the set of targets;
   evaluate each candidate rank vector of the set of candidate rank vectors; and
   select the rank vector of the set of candidate rank vectors based on evaluations of a minimization function using the set of candidate rank vectors.

* * * * *